United States Patent [19]

Christenson

[11] 4,311,415

[45] Jan. 19, 1982

[54] APPARATUS AND METHOD FOR INCREASING THE LOAD BEARING STRENGTH OF A PILE

[75] Inventor: Lowell B. Christenson, Houston, Tex.

[73] Assignee: Engineered Piling Systems, Inc., El Segundo, Calif.

[21] Appl. No.: 132,242

[22] Filed: Mar. 20, 1980

[51] Int. Cl.³ .......................... E02D 3/11; E02D 7/26
[52] U.S. Cl. ................................ 405/228; 204/180 R; 204/299 R; 405/131; 405/232
[58] Field of Search ............... 405/131, 228, 232, 258; 166/248; 204/180 R, 299 R

[56] References Cited

U.S. PATENT DOCUMENTS

| | | | |
|---|---|---|---|
| 2,099,328 | 11/1937 | Casagrande | 405/131 X |
| 3,766,980 | 10/1973 | Kern | 166/248 |
| 4,046,657 | 9/1977 | Abbott | 204/180 R |
| 4,119,511 | 10/1978 | Christenson | 204/180 R |
| 4,124,483 | 11/1978 | Christenson | 204/299 R |
| 4,157,287 | 6/1979 | Christenson | 204/180 R |

OTHER PUBLICATIONS

Nikolaev, "Pile Driving by Electro-Osmosis", Consultants Bureau, 1962.

Primary Examiner—David H. Corbin
Attorney, Agent, or Firm—Fulbright & Jaworski

[57] ABSTRACT

An apparatus and method of driving and increasing the load bearing strength of an electrically conductive pile driven into soil having water above the soil. The top of the pile is insulated on the outside, but the bottom is uninsulated. The pile is driven into the water and soil until the insulator is below the bottom of the water thereby insulating the pile from the water. The anode of an electrical circuit having an anode, a d-c power source, and at least one cathode, is connected to the pile with the cathode placed in the soil. Current is directed from the anode to the cathode through the soil drying out the soil about the uninsulated portion of the pile for reducing the water content of the soil adjacent the uninsulated portion and increasing the load bearing strength of the soil. The length of the uninsulated pipe is at least as great as the length of the insulated pipe and the length of the insulator is substantially the same as the length of the pile above the soil. Preferably the cathode encircles the pile for drying out the soil all around the pile. Another method for increasing the load bearing strength of an electrically conductive uninsulated pile driven into the soil includes insulating the top of an elongate cathode on the outside with an electrical insulator but leaving the bottom of the cathode uninsulated. The cathode is driven into the water and soil until the insulator extends below the bottom of the water. An anode is connected to the pile and electrical d-c current flows from the anode to the cathode through the soil instead of through the water and reduces the water content of the soil and increases the load bearing strength of the pile.

11 Claims, 6 Drawing Figures

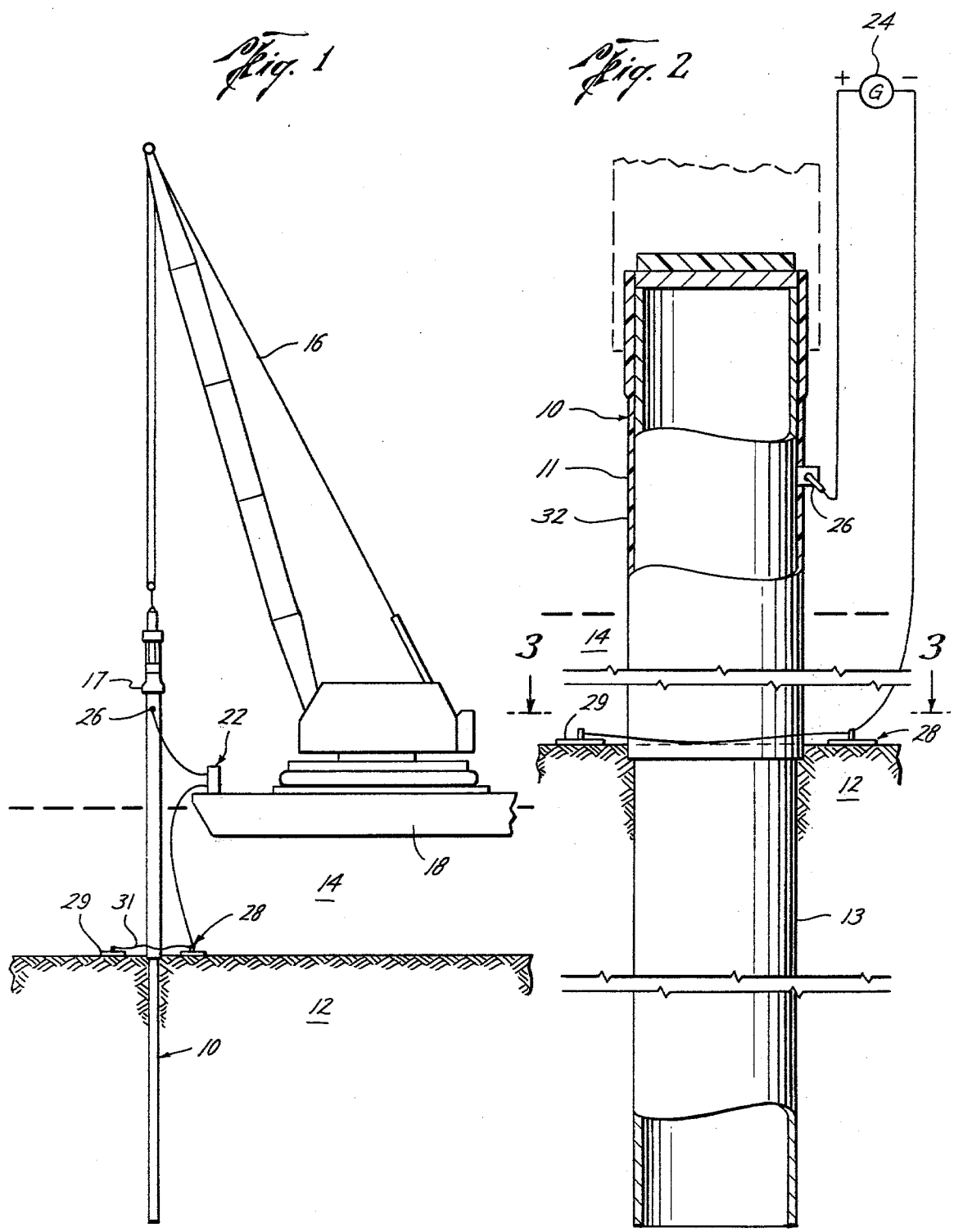

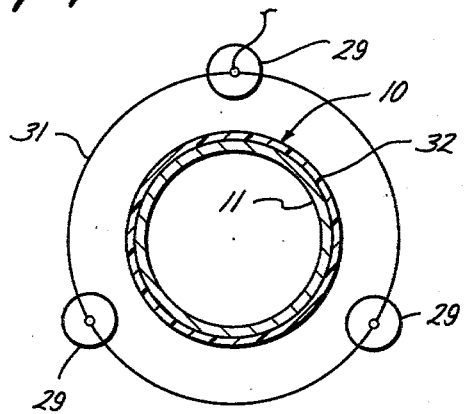
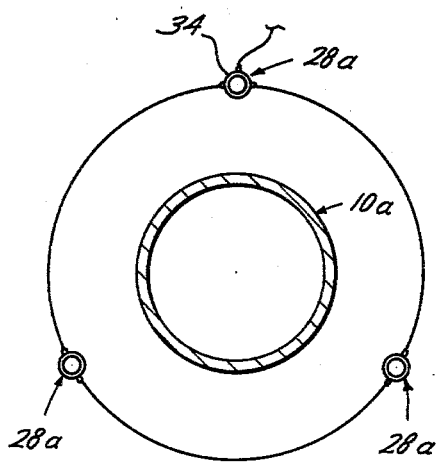
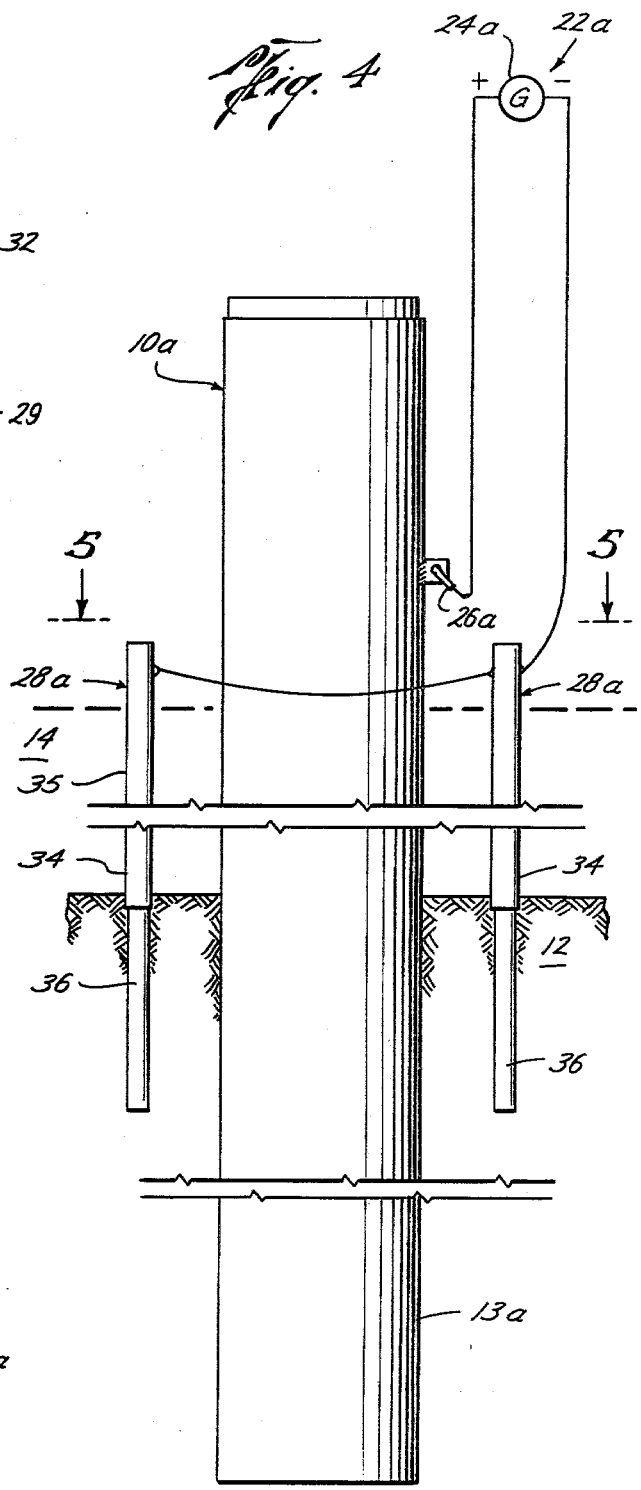

APPARATUS AND METHOD FOR INCREASING THE LOAD BEARING STRENGTH OF A PILE

BACKGROUND OF THE INVENTION

It is generally known to utilize the principle of electro-osmosis to both assist pile driving and increase the load bearing strength of the soil as described in "Pile Driving by Electro-Osmosis", Nikolaev, Consultants Bureau, 1962; and U.S. Pat. Nos. 4,046,657; 4,119,511; 4,124,483; and 4,157,287.

The present invention is directed to an apparatus and method of driving and/or increasing the load bearing strength of an electrically conductive pile driven into soil having water above the soil. The invention is particularly applicable to piling driven into clay soil of low shear strength in which electro-osmosis is utilized to dry out and consolidate the soil and enhance its shear strength thereby increasing the load bearing of the piling. By increasing the load bearing strength of the soil, the piling need not be driven to deeper depths to obtain the necessary firm support, shorter piles may be used, and the cost of installing piling greatly decreases. The present invention maximizes the area of the load bearing support by utilizing an electrical conductive portion of the pile in the soil and by drying out the soil about the portion of the pile in the soil.

SUMMARY

The present invention is directed to an apparatus and method of driving and increasing the load bearing strength of an electrically conductive pile driven into soil having water above the soil by insulating the top of the pile on the outside with an electrical insulator but leaving the bottom uninsulated. The pile is driven into the water and soil until the insulator extends below the bottom of the water thereby insulating the pile from the water. An anode of an electrical circuit having an anode, a dc power source, and at least one cathode is connected to the pile and the cathode is placed in the soil. Electrical current is directed from the anode to the cathode, without shorting out through the water, for drying out the soil about the uninsulated portion of the pile for reducing the water content of the soil adjacent the uninsulated portion and increasing the load bearing strength of the soil.

A still further object of the present invention is wherein the length of the uninsulated pipe is at least as great as the length of the insulated pipe for providing a sufficient load bearing area.

Yet a still further object of the present invention is wherein the cathode encircles the pile for drying out the soil in all directions around the pile.

Yet a further object of the present invention is wherein the length of the insulator is substantially the same as the length of the pile extending above the soil.

Still a further object of the present invention is the method of increasing the load bearing strength of an electrically conductive uninsulated pipe driven into soil having water above the soil by insulating the top of at least one elongate cathode on the outside with an electrical insulator but leaving the bottom of the cathode uninsulated. The cathode is driven into the water and soil until the insulator extends below the bottom of the water. The anode of an electrical circuit is connected to the pile and current is directed from the anode to the cathode through the soil for drying out the soil and increasing the load bearing strength. Preferably a plurality of cathodes are equally spaced around the exterior of the pile.

Other and further objects, features and advantages will be apparent from the following description of presently preferred embodiments of the invention, given for the purpose of disclosure and taken in conjunction with the accompanying drawings.

BRIEF DESCRIPTION OF THE DRAWINGS

FIG. 1 is an elevational and schematic view of a pile driver driving a pile into the soil below a body of water and the apparatus of the present invention drying out the soil about the pile, FIG. 2 is an enlarged elevational view, partly in cross section, of the driven pile having the soil being dried out, FIG. 3 is a cross-sectional view taken along the line 3—3 of FIG. 2, FIG. 4 is another embodiment of the present invention for drying out the soil about the driven pile and increasing its load bearing strength, FIG. 5 is a cross-sectional view taken along the line 5—5 of FIG. 4.

DESCRIPTION OF THE PREFERRED EMBODIMENT

Figure 6:
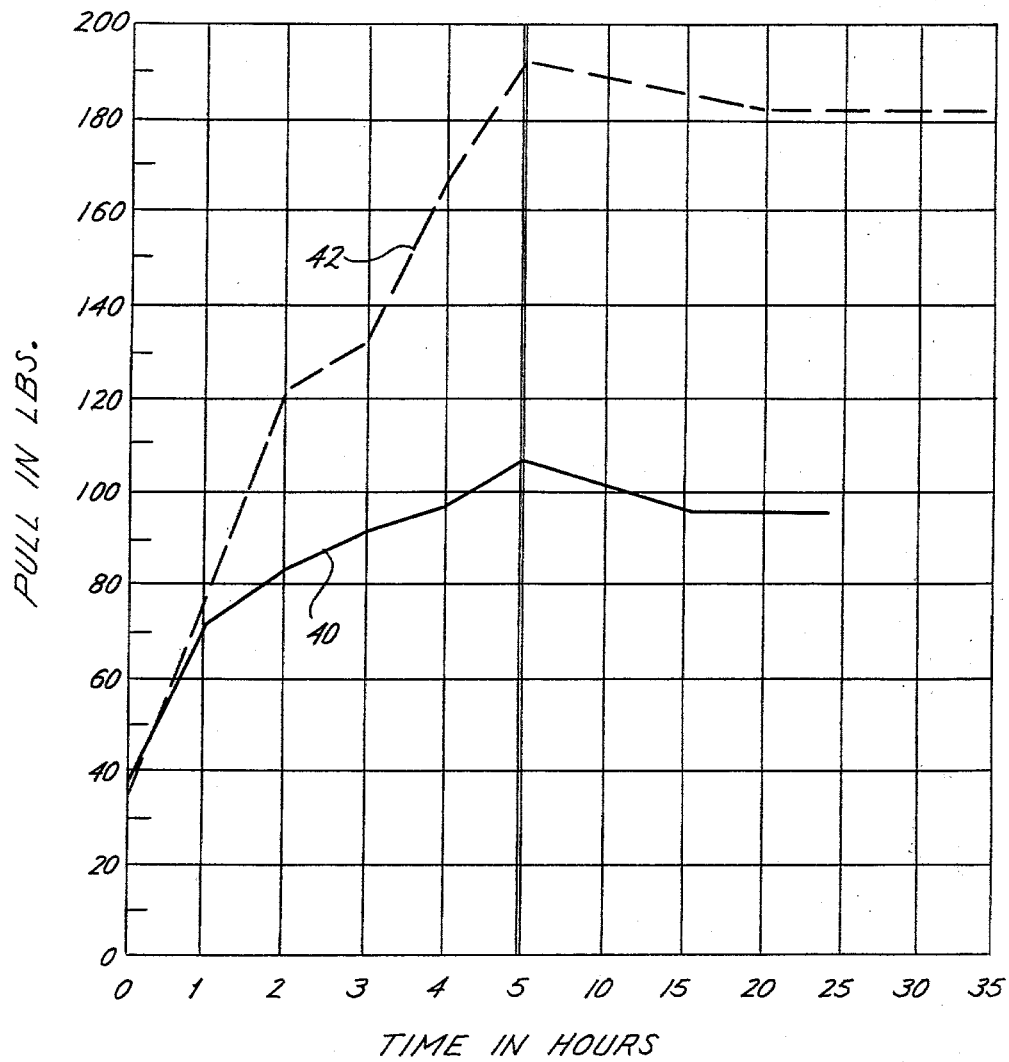
FIG. 6 is a graph illustrating the increase in load bearing strength of a pile by electro-osmosis.

For purposes of illustration, the present invention will be described in conjunction with a pile 10 which is driven into a soil 12 containing water, such as below the bottom of water 14, such as the ocean. The pile 10 may be driven by any suitable mechanism such as pile driver 16 mounted on a floating barge 18.

While the present invention is applicable to increasing the load bearing strength of electrically conductive piles, which may be either hollow or solid and have various shapes, the invention will be described, for purposes of illustration only, of assisting in increasing the load bearing strength of a circular, hollow, electrically conductive pile, typically a hollow steel pipe.

The pile 10 is driven into the soil by the pile driver 16 impacting an anvil 17. However, when the pile 10 is driven into soil 12, such as clay soils of low shear strength, the load bearing strength of the soil 12 and thus of the pile 10 may require that the pile 10 be of greater length and be driven to greater depths in order to insure that the pile 10 will be able to carry the desired loads to which it will be subjected. The present invention utilizes the principle of electro-osmosis by providing an electrical current which will move water away from the driven pile thereby drying out the area around the pile, consolidating the soil about the driven pile, and enhancing the shear strength and increasing the load bearing of the support pile 10.

Referring now to FIGS. 1–3, the electrically conductive pile 10 is provided with a coating 32 insulating the top portion 11 on the outside with an electrical insulator, but the bottom portion 13 of the pile 10 is left uninsulated. The coating 32 may be of any suitable electrical non-conductor such as polyurethane or epoxy. In particular, a polyurethane insulating coating sold under the trade name Zebron or an epoxy such as Colebrand of 10 to 20 mils thickness is satisfactory. The length of the insulator 32 and upper portion 11 of the pile 10 is substantially the same as the length of the pile above the soil 12 whereby the insulator 32 electrically insulates the conductive pile 10 from the water 14. The length of the uninsulated portion 13 of the pile 10 is at least as great as the length of the insulated portion 13 for providing sufficient load bearing strength as may be required and will depend upon such factors as the type of the soil 12 and the amount of load to be supported by the pile 10.

In order to dry out the soil 12 about the uninsulated portion 13 of the pile 10, an electrical circuit, generally indicated by the reference numeral 22, is provided having a conventional d-c power source 24, an anode 26, and cathode means 28 to provide an electrical current moving from the portion 13 of the pile 10 through the soil 12 for moving water from the soil 12 adjacent the pile portion 13 thereby increasing the load bearing strength of the soil 12 and pile 10. The anode 26 is electrically connected through the pile 10 above the surface of the water 14. The cathode means 28 is placed on the soil 12. The insulator 32 prevents the electrical circuit shorting out between the upper portion 11 of the pile 10 and the cathode 28 and instead insures that the electrical circuit will be between the lower portion 11 of the pile 10 and the cathode 28 for drying out the soil 12.

While the cathode 28 may be a single cathode, or a plurality of cathodes, it is preferable that the cathode encircle the pile 10 for uniformly drying out the soil 12 all around the pile 10 for providing the maximum amount of drying action and consequently increasing the load bearing strength between the soil 12 and the pile portion 13 to a maximum. In addition, while the cathode 28 may be an annular solid ring, the cathode 28 as shown in FIGS. 1-3 may be a plurality of plates 29 connected by bare wires 31 to form an annular cathode.

Referring now to FIGS. 4 and 5, another embodiment of the present invention is best seen in which an uninsulated electrically conductive pile 10a has been driven into the soil 12 beneath the water 14. The pile 10a is not provided with any insulation. An electrical circuit, 22a is provided having a d-c power source 24a, an anode 26a, and one or more cathodes 28a. The anode 26a is electrically connected to the electrically conductive pile 10a. The cathodes 28a are driven into the soil 12 about the circumference of the piling 10a. Increasing the number of cathodes 28a will increase the drying out of the soil 12 about the piling 10a. If desired, a single annular ring could be driven into the soil 12 to act as a cathode. In order to direct the electrical current from the portion 13a of the pile 10a which is below the water 12 to the cathodes 28a, the cathodes 28a are provided with an insulating coating 34 around the outside on the top portion 35 of the cathodes 28a, leaving the bottom portion 36 of the cathodes 28a uninsulated. The insulation extends through the water 14 to the soil 12 thereby insulating the bare portion 36 of the cathodes 28a from the water 14. Therefore, with electrical power supplied by the electrical power source 24a between the pile 10a and the cathodes 28a, electrical current will flow through the soil 12 between the bottom portion 13a of the pile 10a and the lower portion 36 of the cathodes 28a causing water to migrate away from the bottom portion 13a of the pile 10a and drying out the soil about the portion 13a and increasing the load bearing strength of the pile 10a.

Referring now to FIG. 6, a graph is shown of pull in pounds versus time in hours of two tests made using the present invention. Test one is indicated on graph 40 and was a laboratory test in which the embodiment of FIGS. 1-3 was utilized having only a single anode plate such as one of the plates 29. Test #2 illustrated by the graph 42 was a test similar to test #1 with the exception that the cathode was in the form of cathode 28 shown in FIGS. 1-3. In both tests electricity was applied for five hours. The pull in pounds is an indication of shear strength between the soil and the pile and thus of its load bearing capacity. It is to be noted that in both tests the shear strength of the pile was considerably increased by the use of electro-osmosis, and the piles retained increased shear strength even after discontinuance of the electrical current. However, the use of the annular cathode in test #2 as shown by graph 42, indicates the superiority and advantage of drying out the soil about the entire circumference of the pile. It was also noted that while the voltage applied in each test was the same, the current drain in test #2 was twice the current in test #1 indicating the increase in drying out performed in test #2. It was noted that at the conclusion of each test as the test specimen was removed from the clay that the clay adhered to the exterior surface of the metal in a peculiar pattern. In the case of test #1, where the single cathode was used, the clay adhered to the pile in an area about one quarter of the circumference nearest the location of the cathode. In test #2 where the three connected cathodes were used, the clay adhered to the surface of the pile entirely around the circumference of the pile. This tends to bear out the difference in the pull tests since a greater area is affected by the circular cathode.

The present invention, therefore, is well adapted to carry out the objects and attain the ends and advantages mentioned as well as others inherent therein. While presently preferred embodiments of the invention have been given for the purpose of disclosure, numerous changes in the details of construction, and steps of the process will readily suggest themselves to those skilled in the art and which are encompassed within the spirit of the invention and the scope of the appended claims.

What is claimed is:

1. The method of driving and increasing the load bearing strength of an electrically conductive pile driven into soil having water above the soil comprising, insulating the top of the pile on the outside with an electrical insulator, but leaving the bottom uninsulated, driving the pile into the water and soil until the insulator is below the bottom of the water, connecting the anode of an electrical circuit having an anode, a d-c power source, and at least one cathode to the pile, placing the cathode in the soil, and directing dc current from the anode to the cathode for drying out the soil about the uninsulated portion of the pile for reducing the water content of the soil adjacent the uninsulated portion and increasing the load bearing strength of the pile.

2. The method of claim 1 wherein the length of the uninsulated pile is at least as great as the length of insulated pile for providing sufficient load bearing strength.

3. The method of claim 1 wherein the cathode encircles the pile for drying out the soil all around the pile.

4. The method of claim 1 wherein the length of the insulator is substantially the same as the length of pile above the soil.

5. The method of driving and increasing the load bearing strength of an electrically conductive pile driven into soil having water above the soil comprising, driving the pile into the water and soil, placing at least one cathode in the soil, prior to driving the pile and placing the cathode, placing insulation on either the cathode or pile for preventing an electrical path through the water between the cathode and the pile, connecting the anode of an electrical circuit having an anode, a d-c power source and said cathode, to the pile, directing d-c current from the anode to the cathode through the soil for drying out the soil for reducing the water content of the soil adjacent the pile and increasing the load bearing strength of the pile.

6. The method of increasing the load bearing strength of an electrically conductive uninsulated pile driven into soil having water above the soil comprising, insulating the top of an elongate cathode on the outside with an electrical insulator, but leaving the bottom of the cathode uninsulated, driving the cathode into the water and soil until the insulator is below the bottom of the water, connecting the anode of an electrical circuit having an anode, a d-c power source, and said cathode, to the pile, directing d-c current from the anode to the cathode through the soil for drying out the soil about the pile for reducing the water content of the soil adjacent the pile and increasing the load bearing strength of the pile.

7. An apparatus for increasing the load bearing strength of an electrically conductive pile driven into soil having water above the soil comprising, an electrical insulator coating the top of the pile on the outside and extending to the bottom of the water for insulating the pile from the water but the portion of the pile positioned in the soil being uninsulated, an electrical circuit having a d-c power source, an anode, and a cathode, said anode being connected to the piling, and said cathode positioned in the soil whereby current flow through the circuit dries out the soil about the uninsulated portion of the pile and increases the load bearing strength of the pile.

8. The apparatus of claim 7 wherein the length of the uninsulated portion of the pile is at least as great as the length of the coating for providing sufficient load bearing strength.

9. The apparatus of claim 7 wherein the cathode encircles the piling.

10. An apparatus for increasing the load bearing strength of an electrically conductive pile driven into soil having water above the soil comprising, an electrical circuit having a d-c power source, an anode and at least one cathode, said cathode being driven into the soil, an electrical insulator coating the top of the cathode on the outside and extending to the bottom of the water for preventing an electrical path through the water between the cathode and the pile, and said anode being connected to the piling whereby current flowing through the soil for drying out the soil for reducing the water content of the soil adjacent the pile and increasing the load bearing strength of the pile.

11. The apparatus of claim 10 wherein the cathode includes a plurality of cathodes equally spaced about the exterior of the pile.

* * * * *